United States Patent Office 3,119,654
Patented Jan. 28, 1964

3,119,654
PRODUCTION OF ALKALI METAL FLUOBORATE
George L. Cunningham, Allentown, Pa., assignor to W. R. Grace & Co., New York, N.Y., a corporation of Connecticut
No Drawing. Filed May 2, 1961, Ser. No. 107,037
5 Claims. (Cl. 23—59)

This invention relates to a process for the production of fluorine values. In one specific aspect, this invention deals with a process for the production of alkali metal fluoborate.

One process previously known for making the alkali metal fluoborates has involved treating fluoboric acid with an alkali metal hydroxide, carbonate, or other salt. Fluoboric acid as most commonly made by the method using hydrofluoric acid and boric acid or boric oxide has been relatively expensive. Consequently, the current process for making alkali metal fluoborate is also necessarily expensive. Fluoboric acid has also been made by reacting acid grade fluospar with sulfuric acid and boric acid or boric oxide, but this process offers little improvement in cost. The necessity of using relatively pure fluoboric acid as one of the reactants in the production of alkali metal fluoborates increases the expense of the process in accordance with the cost of the acid.

As is well known, when phosphate rock, which commonly contains 2.5 to 4.5% of fluorine, is acidified with a strong mineral acid, gases containing fluorine are evolved. In the customary process of making superphosphate fertilizer, fluorine-containing gases are evolved from the mixer in which the acid and rock, in finely divided form, are mixed and from the so-called den in which the mixture is stored. These gases generally are free or substantially free of phosphate. When phosphoric acid is concentrated by evaporation, the gases evolved from the acid concentrator also generally contain fluorine compounds. These fluorine-containing gases, in which the fluorine is present principally as silicon tetrafluoride are scrubbed with water. This is an old, well-known and highly efficient method for the recovery of fluorine from such gases, and solutions containing from 2% to 30% or more of $H_2SiF_6$ are obtained. This, then is used to prepare numerous by-products, among the more commonly made ones of which are alkali metal fluorides, ammonium fluoride, and ammonium acid fluoride.

It is an object of this invention to provide an economical process for the production of alkali metal fluoborates.

It is a further object of this invention to avoid the use of both hydrofluoric acid and boron tetrafluoride in alkali metal fluoborate production.

It is still a further object of this invention to provide a new and improved process for the preparation of alkali metal fluoborates in substantial yields from readily available ammonium fluoride, alkali metal fluoride and boric acid or boric oxide.

The process of the present invention is based on the discovery that an alkali metal fluoride will react with ammonium fluoride or ammonium acid fluoride, and boric acid or boric oxide in aqueous solution to form the alkali metal fluoborate. The process has other advantages beyond its basically economic character in that it is not difficult to carry out. In the process of the invention the reactants can be brought together as aqueous solutions, they may be added as solids to a limited amount of water such that a slurry is produced, or they may be reacted together as solids. In any case, when the temperature is raised ammonia and water are evolved, and the process is continued until the mass is solid. The solid remaining will be practically pure alkali metal fluoborate. Instead of using the normal alkali metal fluoride, the alkali metal acid fluoride, such as sodium acid fluoride or potassium acid fluoride may be used. The amount of water is not critical, but it should be understood that to cause the reaction to go to completion, the ammonia and water must be evaporated off and thus the use of excess water will increase the cost of evaporation.

The fluoride salts used as reactants in the process of the invention may be the normal fluoride or the acid fluoride or a mixture of the two salts. The amounts added are not critical but, in order to obtain substantially pure alkali metal fluoborates, they should be in stoichiometric ratio. If excess alkali metal fluoride or acid fluoride is used, the resulting product will contain alkali fluoride or alkali metal acid fluoride. If excess ammonium fluoride or ammonium acid fluoride are used, the product will be a complex containing in excess of four atoms of fluorine per molecule of salt. The impure alkali metal fluoborate obtained in the first step may be purified by crystallization from water.

The general reactions of the aforementioned process can be represented as follows, using sodium as an illustrative example:

$NaF + 3NH_4F + H_3BO_3 \rightarrow NaBF_4 + 3NH_3 + 3H_2O$ $2NaF + 6NH_4F + B_2O_3 \rightarrow 2NaBF_4 + 6NH_3 + 3H_2O$ $2NaF + 3NH_4HF_2 + 2H_3BO_3 \rightarrow 2NaBF_4 + 3NH_3 + 6H_2O$ $2NaF + 3NH_4HF_2 + B_2O_3 \rightarrow 2NaBF_4 + 3NH_3 + 3H_2O$ The following examples are given for purposes of illustration and are not intended to limit the scope of the invention in any way.

*Example I*

14.0 parts of NaF, 37.04 parts of $NH_4F$ and 11.61 parts of $B_2O_3$ were placed in 100 parts of water. The solution was evaporated to dryness. 17.0 parts of ammonia and 109 parts of water were evolved. The solid obtained weighed 38.6 parts and was high grade sodium fluoride. It contained no ammonia.

*Example II*

31.38 parts of $KF \cdot 2H_2O$, 37.04 parts of $NH_4F$ and 11.61 parts $B_2O_3$, were placed in 100 parts of water. The solution was evaporated to dryness. 17.0 parts of ammonia and 121 parts of water were evolved. 43 parts of solid were obtained which was practically pure potassium fluoborate. The solid contained no ammonia.

*Example III*

20.67 parts of $NaHF_2$, 19 parts of $NH_4HF_2$ and 11.61 parts of $B_2O_3$ were placed in 100 parts of water. The solution was evaporated to dryness to remove 5.67 parts of ammonia and 109 parts of water. The solid was practically pure sodium fluoborate.

*Example IV*

26.04 parts of $KHF_2$, 19 parts of $NH_4HF_2$ and 11.61 parts of $B_2O_3$ were placed in 100 parts of water. The solution was evaporated to dryness to remove 5.67 parts of ammonia and 109 parts of water. The solid was practically pure potassium fluoborate. The solid contained practically no ammonia.

In the foregoing description, I have described such details of procedure as are necessary to enable one skilled in the art of which this invention relates to practice the invention. Procedures such as the acidification and subsequent treatment of phosphate rock, the scrubbing of fluorine-containing gases with water, and the manner in which solutions to be reacted are mixed and precipitates are filtered and washed are carried out by means well known to those skilled in the art.

I claim:
1. A process for the production of alkali metal fluo- borates consisting of chemically combining alkali metal fluoride with stoichiometric quantities of a single reactant from each of the two groups consisting of ammonium fluoride and ammonium acid fluoride, and boric acid and boric oxide in aqueous solution, evaporating said solution to dryness thereby driving off water and ammonia, and recovering solid alkali metal fluoborate.

2. In a process for the production of alkali metal fluoborates from alkali metal fluoride along with stoichiometric quantities of a member from the group consisting of ammonium acid fluoride and ammonium fluoride and a member from the group consisting of boric acid and boric oxide the steps of: forming an aqueous solution of the aforementioned reactants, heating said solution to drive off all ammonia and water, thereby forming a solid mass consisting of alkali metal fluoborate and purifying said alkali metal fluoborate by crystallization from water.

3. In a process for the production of pure alkali metal fluoborates from alkali metal fluoride along with a member from the group consisting of ammonium acid fluoride and ammonium fluoride and a member from the group consisting of boric acid and boric oxide the steps of: forming an aqueous solution of the aforementioned reactants in stoichiometric ratio, raising the temperature to the point where all ammonia and water are driven off resulting in a solid mass, said mass consisting of substantially pure alkali metal fluoborate and further purifying said alkali metal fluoborate by crystallization from water.

4. In a process for the production of alkali metal fluoborate from alkali metal fluoride along with stoichiometric quantities of a member from the group consisting of ammonium acid fluoride and ammonium fluoride, and a member from the group consisting of boric acid and boric oxide the steps of: combining the aforementioned reactants as solids in a limited amount of water so that a slurry is produced, and heating said slurry to drive off all ammonia and water, thereby forming a solid mass consisting of alkali metal fluoborate, and purifying said alkali metal fluoborate by crystallization from water.

5. In a process for the production of pure alkali metal fluoborates from alkali metal fluoride along with a member from the group consisting of ammonium acid fluoride and ammonium fluoride and a member from the group consisting of boric acid and boric oxide the steps of: combining the aforementioned reactants in stoichiometric ratio as solids in a limited amount of water such that a slurry is produced, raising the temperature to the point where all ammonia and water are driven off resulting in a solid mass, said mass consisting of substantially pure alkali metal fluoborate and further purifying said alkali metal fluoborate by crystallization from water.

References Cited in the file of this patent

Mellor: "Comprehensive Treatise on Inorganic and Theoretical Chemistry," Longmans Green & Co., New York, 1923, vol. 5, pages 126 and 127.